(12) United States Patent　(10) Patent No.:　　US 6,185,178 B1
Noh　　　　　　　　　　　　　　　(45) Date of Patent:　　Feb. 6, 2001

(54) TRACKING CONTROL METHOD FOR OPTICAL STORAGE APPARATUS USING NEAR FIELD OPTICAL EFFECT AND OPTICAL PROBES

(75) Inventor: Sung Woo Noh, Kyungki-do (KR)

(73) Assignee: LG Electronics Inc., Seoul (KR)

( * ) Notice: Under 35 U.S.C. 154(b), the term of this patent shall be extended for 0 days.

(21) Appl. No.: 09/057,456

(22) Filed: Apr. 9, 1998

(30) Foreign Application Priority Data

Apr. 12, 1997　(KR) .................................................. 97-13505

(51) Int. Cl.⁷ ........................................................ H01J 37/26
(52) U.S. Cl. .............................................................. 369/126
(58) Field of Search .................................. 369/44.11, 126

(56) References Cited

U.S. PATENT DOCUMENTS

| | | | |
|---|---|---|---|
| 5,294,790 | * | 3/1994 | Ohta et al. ............................. 250/216 |
| 5,625,617 | * | 4/1997 | Hopkins et al. .................. 369/126 X |
| 5,638,111 | * | 6/1997 | Hirokanne et al. ................... 347/256 |
| 5,978,326 | * | 11/1999 | Shido ................. 369/126 X |
| 6,011,664 | * | 1/2000 | Krydet et al. ..................... 369/126 X |

FOREIGN PATENT DOCUMENTS

| | | | |
|---|---|---|---|
| 7-272279 | * | 4/1995 | (JP) .................................. 369/126 X |
| 7-98885 | * | 4/1995 | (JP) .................................. 369/126 X |

* cited by examiner

Primary Examiner—Aristotelis M. Psitos

(57) ABSTRACT

An optical storage apparatus, using the near field optical effect, performs tracking along a track of a recording medium to reproduce information recorded on the recording medium without error. The optical storage apparatus includes a first probe to read information recorded on the recording medium and at least two to judge if the track direction of the recording medium is in accordance with the information scanning direction of the first probe. The apparatus also includes a probe actuator to adjust the tracking direction of the first and second probes using a tracking control signal, and a number of sensors to sense the intensity of radiation probed by the first and second probes and to generate tracking signals corresponding to the sensed radiation. The apparatus also includes a controller to generate a tracking control signal using the tracking signals, and to provide the tracking control signal to the probe actuator.

14 Claims, 5 Drawing Sheets

FIG.6a
FIG.6b
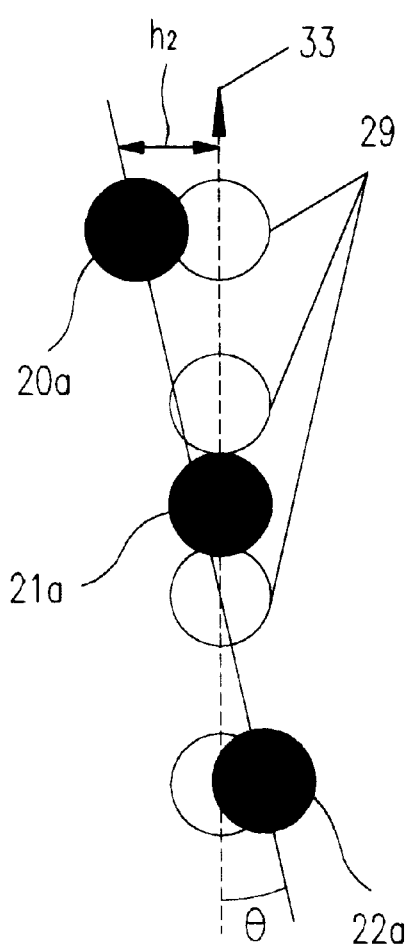
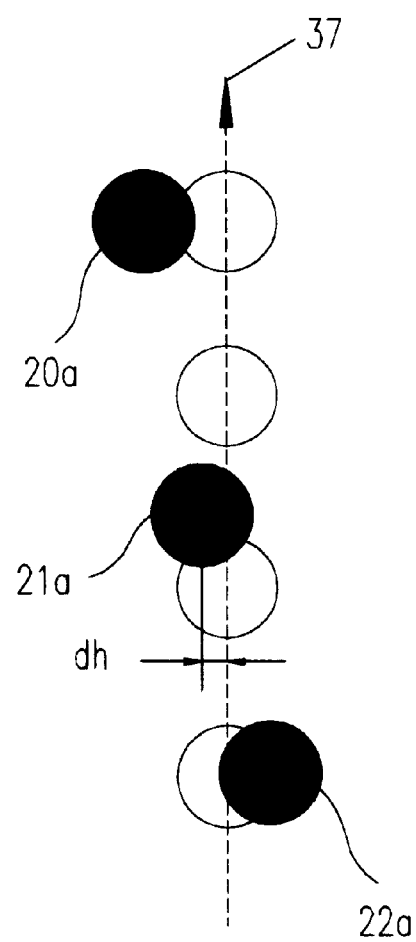

TRACKING CONTROL METHOD FOR OPTICAL STORAGE APPARATUS USING NEAR FIELD OPTICAL EFFECT AND OPTICAL PROBES

BACKGROUND OF THE INVENTION

1. Field of the Invention

The present invention relates to optical storage, specifically, to an optical storage using near field optical effect, to which tracking control function is added, and tracking control method using the optical storage.

2. Discussion of Related Art

An optical recording medium such as a CD-ROM focuses incident rays using an object lens, to form an optical spot. This optical spot is projected on data marks recorded on a recording medium, to read optical information recorded thereon. It is impossible for the optical spot to be smaller than the wavelength of the incident rays because of optical diffraction effect. Accordingly, in case of the incident rays having 780 nm of wavelength, the minimum size of the data mark which is able to be recorded and reproduced becomes 780 nm, reaching the limit of recording density. To overcome the limit, an optical storage using the principle of near field scanning microscope is currently being developed. FIG. 1 shows the configuration of the optical storage using near field optical effect.

FIG. 1 shows a conventional optical storage, FIG. 2 shows the cross section of the fiber probe of FIG. 1, and FIG. 3 shows the relation between data marks recorded on the track of a conventional recording medium and scanning line. Referring to FIG. 1, the conventional optical storage includes a recording medium 6 on which information is recorded, an optical source 7 from which rays of light are projected to recording medium 6, a fiber probe 1 for probing the intensity of radiation, distributed on the recording medium, to read the information recorded on the recording medium, a probe driver 5 for controlling the location of fiber probe 1, and an optical sensor 4 for sensing the intensity of radiation of the rays of light, transmitted through fiber probe 1.

Fiber probe 1, as shown in FIG. 2, is formed of an optical fiber 12 whose one end has conical shape. A metal layer 2 such as Al is formed on the conical portion of the fiber probe, and an aperture 3 is formed at the end of the fiber probe, where metal layer 2 is removed. The aperture conventionally has an opening with the diameter d1 of below 100 nm. Metal layer 2 allows the rays of light from optical source to pass only through aperture 3, and prevents them from being incident to portions other than aperture 3.

The operation principle of the conventional optical storage is described below. When rays of light provided by optical source 7 are projected on recording medium 6, the intensity of radiation is demodulated by data marks 8 recorded on recording medium 6, forming the distribution of intensity of radiation, corresponding to data marks 8, on the front of recording medium 6. Then, fiber probe 1 approaches recording medium 6 under the control of probe driver 5. Here, when the distance between aperture 3 of fiber probe 1 and recording medium 6 is longer than the diameter d1 of aperture 3, the rays of light cannot pass through aperture 3 optically. Accordingly, optical sensor 4 cannot sense any signal.

On the other hand, when fiber probe 1 approaches recording medium more closely, to allow the distance between aperture 3 and recording medium 6 to be shorter than the diameter d1 of aperture 3, a portion of rays of light, which has passed recording medium 6, enters fiber probe 1 through aperture 3, to be applied to optical sensor 4. Optical sensor 4 generates a signal in proportion to the intensity of radiation of the applied light. As described above, when the distance between aperture 3 and recording medium 6 is maintained, probe driver 5 drives fiber probe 1 to scan the surface of recording medium 6. Then, the distribution of intensity of radiation, formed by data marks 8 recorded on recording medium 6, is sensed by optical sensor 4. Optical sensor 4 generates a signal corresponding to the distribution of intensity of radiation. Through this process, the conventional optical storage reproduces information of data marks 8 recorded on recording medium 6. Conventionally, the size of aperture 3 can be smaller than the wavelength of rays of light from optical source 7. This is able to realize high-density optical storage which reads information of the data mark smaller than the wavelength of rays of light from the optical source.

However, the conventional near field optical storage must solve a tracking problem, as shown in FIG. 3. When data marks 8 are arranged in a straight line along a track 9 on recording medium 6, fiber probe 1 reads information recorded in data marks 8 of recording medium 6, moving along a specific scanning line 10. When scanning line 10 does not accord with the direction of track 9 as shown in FIG. 3, fiber probe 1 gradually deviate from track 9. Thus, the fiber probe cannot read the information recorded in data marks 8 unless the scanning line accords with the direction of track 9. Accordingly, with the conventional optical storage, it is required that track 9 and scanning line 10 accord with each other exactly.

However, since the deviation between scanning line 10 and track 9 cannot be detected by conventional techniques, the directions of track 9 and scanning line 10 should primarily accord with each other mechanically. In this case, when it is assumed that the length of the scanning line is L, allowable angle difference (a) between track 9 and scanning line 10 corresponds to the following expression.

$$La < d1, \text{ that is, } a < d1/L$$

Since d1 is 50 nm and L is 1 mm conventionally, angle difference (a) becomes less than 0.003 (deg). This is difficult to realize actually. Accordingly, the aforementioned tracking problem must be solved in order to realize the optical storage using near field optical effect. The above-mentioned optical storage performs tracking using one fiber probe. Thus, it cannot read the information recorded on the recording medium because of the track direction and scanning direction out of accordance with each other. To reduce error in reading of information, the conventional optical storage has employed a method of making the scanning direction of the fiber probe accord with and track direction physically. However, this optical storage could not completely correct the error because the track and scanning line for every recording medium are difficult to accord with each other.

SUMMARY OF THE INVENTION

Accordingly, the present invention is directed to an optical storage using near field optical effect and tracking control method using the same that substantially obviates one or more of the problems due to limitations and disadvantages of the related art.

An object of the present invention is to provide an optical storage using near field optical effect, which performs tracking along a track, the arrangement of data marks recorded on a recording medium, to reproduce information recorded on the recording medium without error.

Another object of the present invention is to provide a tracking control method in the optical storage using near field optical effect.

The optical storage using near field optical effect, which has an recording medium and optical source, according to the present invention comprises a plurality of probing means for reading information recorded on the recording means and probing the track direction of the recording means, driving means for driving the plurality of probing means according to a tracking control signal, to control the tracking direction of the probing means, and control means for providing the tracking control signal to the driving means using information sensed by the probing means.

According to a preferred embodiment of the invention, the optical storage using near field optical effect, which has a recording medium and optical source, includes: first probing means for probing the intensity of radiation distributed on the recording medium, to read information recorded on the recording medium; a plurality of second probes for probing the intensity of radiation distributed on the recording medium, to judge if the track direction of the recording medium accords with the information scanning direction of the first probe; probe control means for controlling the tracking direction of the first and second probing means according to a tracking control signal; record information generating means for sensing the intensity of radiation probed by the first probe, to generate a information signal corresponding to information recorded on the recording medium; optical sensing means for sensing the intensity of radiation probed by the plurality of second probes, to generate tracking signals corresponding to the sensed intensity of radiation; and control means for generating a tracking control signal according to the tracking signals generated by the optical sensing means, and providing it to the probe control means.

The tracking control method using the optical storage using near field optical effect according to the present invention comprises the steps of probing the intensity of radiation distributed on a recording medium on which information is recorded, to judge the track direction of the recording medium accords with the scanning direction for the information, sensing the intensity of radiation to generate tracking signals corresponding thereto, providing a tracking control signal for according the track direction with the scanning direction according to the track signals, controlling the scanning direction to accord with the track direction according to the tracking control signal, and reproducing the information recorded on the recording means when the scanning direction accords with the track direction.

According to a preferred embodiment of the invention, the tracking control method in an optical storage having a fiber probe and tow tracking probes, comprises the steps of: probing the intensity of radiation distributed on a recording medium with the two tracking probes, sensing the intensity of radiation to generate tracking signals corresponding thereto; judging if the track direction of the recording medium on which information is recorded accords with the scanning direction of the fiber probe; reproducing the information recorded on the recording medium using the fiber probe when the track direction accords with the scanning direction, and providing a tracking control signal for according the scanning direction with the track direction depending on the tracking signal when it does not; controlling the scanning direction to accord with the track direction according to the tracking control signal; and reproducing the information recorded on the recording medium when the scanning direction accords with the track direction.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIGS. 6A and 6B show tracking control process according to the relation between data marks recorded on a track of a recording medium and scanning line in the optical storage in accordance with the present invention.

DETAILED DESCRIPTION OF PREFERRED EMBODIMENT

Reference will now be made in detail to the preferred embodiments of the present invention, examples of which are illustrated in the accompanying drawings.

Figure 1:
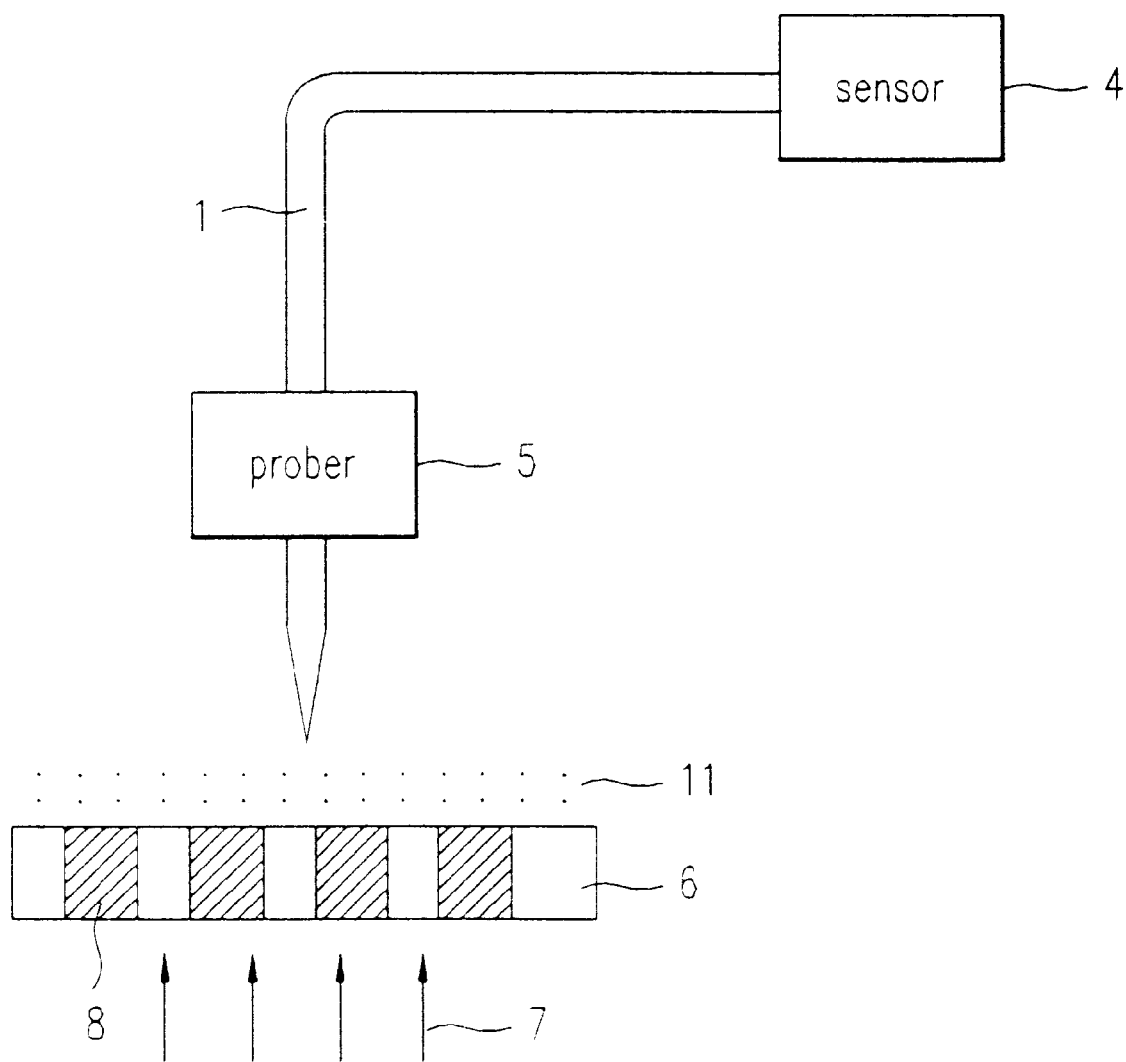
FIG. 1 shows a conventional optical storage.
Figure 2:
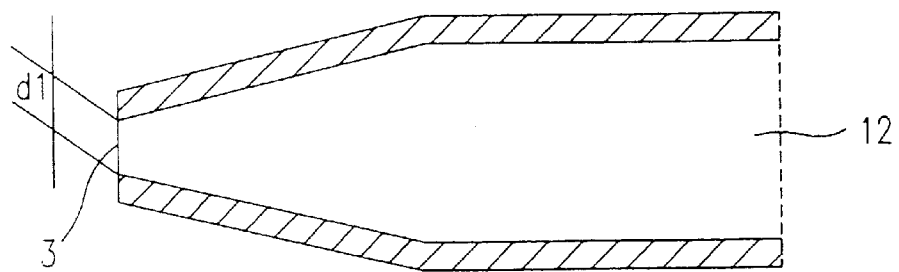
FIG. 2 shows the cross section of the fiber probe of FIG. 1.
Figure 3:
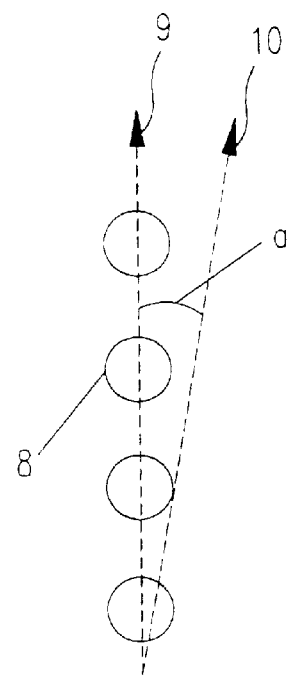
FIG. 3 shows the relation between data marks recorded on a track of a recording medium and scanning line in the conventional optical storage.
Figure 4:
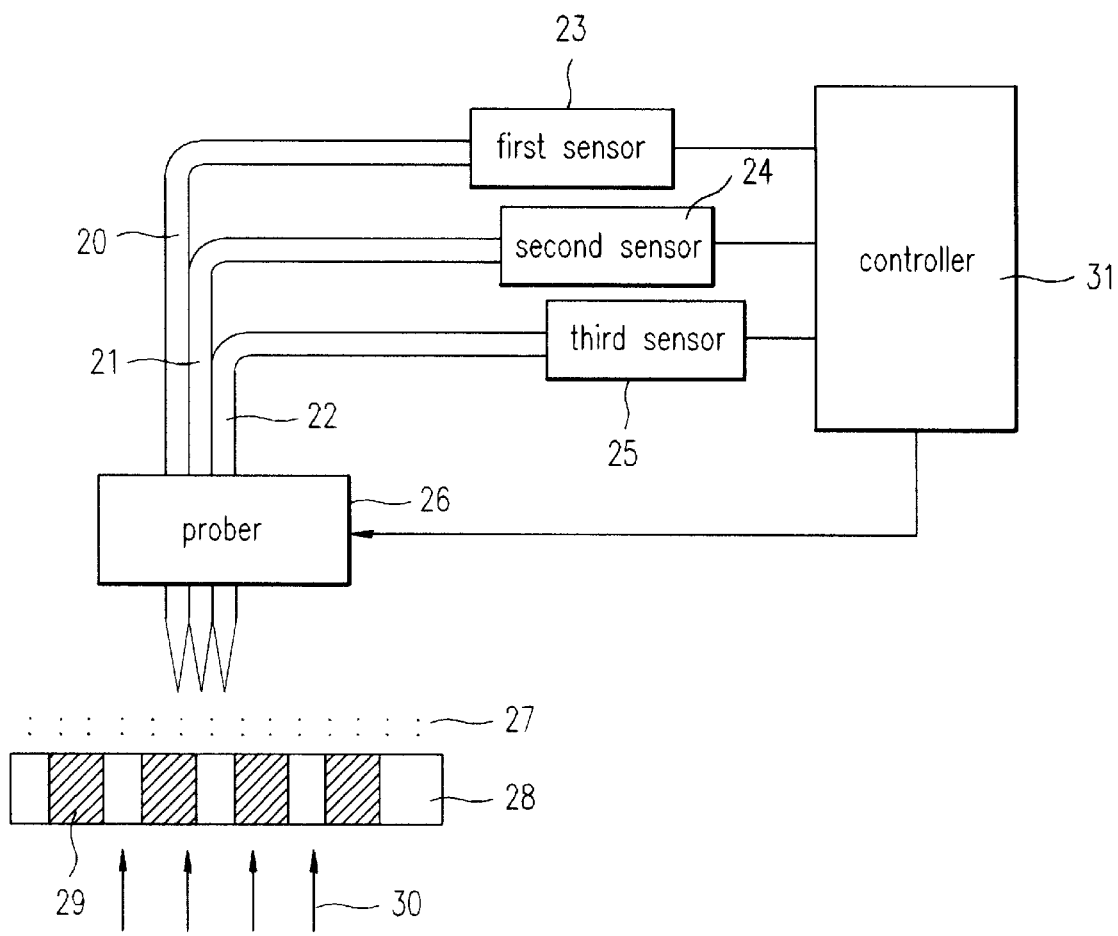
FIG. 4 shows a tracking controllable optical storage using near field optical effect according to the present invention.
Figure 5:
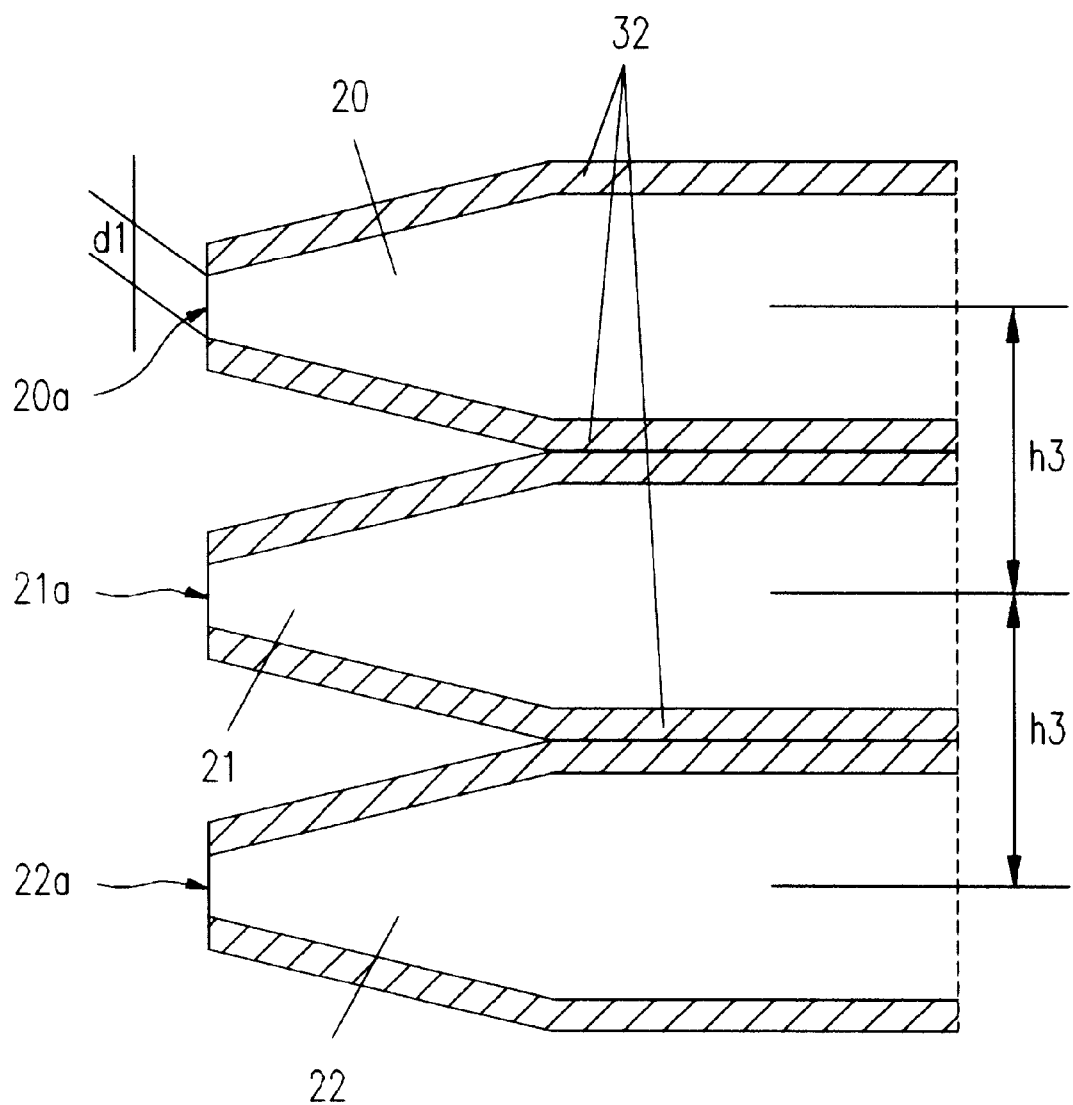
FIG. 5 shows the cross sections of the fiber probe and tracking probe of FIG. 4.

FIG. 4 shows a tracking controllable optical storage according to the present invention, and FIG. 5 shows the cross sections of the fiber probe and tracking probe of FIG. 4. Explanations for the same constituent elements as those of the conventional one will be omitted. Referring to FIG. 4, the optical storage of the invention includes a recording medium 28 on which information is recorded in the form of data marks 29, an optical source 30 from which rays of light are projected to recording medium 28 to create distribution 27 of intensity of radiation corresponding to data marks 29, a fiber probe 21 for reading the information recorded on recording medium 28, two tracking probes 20 and 22, attached to both sides of fiber probe 21, for generating tracking signals to a controller 31, a probe driver 26, attached to fiber probe 21 and tracking probes 20 and 22, for driving them according to a first control signal, three optical sensors 23, 24 and 25 for sensing optical signals transmitted from probes 20, 21 and 22 respectively, to generate a first signal, and controller 31 for providing the first control signal to probe driver 26 using the first signal generated by optical sensors 23 and 25.

Referring to FIG. 5, each of fiber probe 21 and tracking probes 20 and 22 is formed of an optical fiber whose one end is sharp in conical shape. Metal layers 32 are formed on the conical portions of the probes, and apertures 20a, 21a and 22a each of which has the diameter d1 are formed on the ends of the probes, where metal layers 32 are removed. Metal layer 32 is formed of metal which can intercept rays of light, and Au is conventionally used for it. Probes 20, 21 and 22 are respectively connected to three optical sensors 23, 24 and 25. Fiber probe 21 and tracking probes 20 and 22 are attached to probe driver 26, and their points are arranged in a straight line, having a specific interval h3. The straight line formed by three probes 20, 21 and 22 is at a specific angle θ to the direction of arrangement of data marks 29 formed on recording medium 28, that is, the direction of track 33, as shown in FIG. 6A.

Here, when size of data mark 29 is d2, and it is defined that h2=h3 sin θ, the angle θ is controlled to make h2<d2/2. Referring to FIG. 6a, h2 indicates the distance from the center of apertures 20a and 22a to the center of data marks 29, h3 indicates the distance from the center of tracking probes 20 and 22 to the center of fiber prove 21, and θ indicates the angle between apertures 20a and 22a of tracking probes 20 and 22 and data marks 29.

The operation of the optical storage having the above configuration is explained below. First of all, rays of light from optical source 30 are projected to recording medium 28, and modulated by data marks 29 recorded on recording medium 28, forming distribution 27 of intensity of radiation corresponding to information recorded on the front of recording medium 28. Then, fiber probe 21 and tracking probes 20 and 22 attached to probe driver 26 approach recording medium 28. Here, when the distance between apertures 20a, 21a and 22a and recording medium 28 becomes below d1, optical tunneling occurs according to near field effect. Due to this optical tunneling effect, the rays of light enter probes 20, 21 and 22 through apertures 20a, 21a and 22a, to be applied to optical sensors 23, 24 and 25 corresponding to probes 20, 21 and 22 respectively. The intensity of radiation of the rays corresponds to the data marks recorded on the recording medium. Accordingly, the optical sensors generate information signals corresponding to data marks 29 recorded on the recording medium according to the intensity of radiation.

Simultaneously, the rays of light, transmitted through apertures 20a and 22a of tracking probes 20 and 22, are applied to optical sensors 23 and 25 respectively. Then, the optical sensors generate tracking signals corresponding to the intensity of radiation applies them to controller 31. When it is assumed that the tracking signal generated by optical sensor 23 is A and the tracking signal generated by optical sensor 25 is B, controller 31 generates a track control signal T defined by the following expression.

$$T=A-B \qquad (4)$$

Controller 31 applies track control signal T to probe driver 26. Probe driver 26 controls fiber probe 21 and tracking probes 20 and 22 to which the track control signal T from controller 31 is applied, to make the track of recording medium 28 and the scanning lines of probes 20, 21 and 22 be arranged in a straight line. This operation is described below in more detail.

Probe driver 26 drives fiber probe 21 and tracking probes 20 and 22, to allow apertures 20a, 21a and 22a of probes 20, 21 and 22 to rectilinearly move along track 33 of recording medium 28, as shown in FIG. 6A. When the movement direction of apertures 20a, 21a and 22a of probes 20, 21 and 22 accords with track 33 of recording medium 28 completely, aperture 21a of fiber probe 21 passes the centers of data marks 29 all the time. Accordingly, the optical storage of the invention can reproduces optical information recorded on the medium without error. Furthermore, apertures 20a and 22a of tracking probes 20 and 22 are superposed on data marks 29 by the same amount of portion. Thus, T defined by the above expression becomes 0.

When the movement direction of apertures 20a, 21a and 22a deviates from track 33 of recording medium 28 by a specific angle, he center of aperture 21a deviates from the center of data mark 29 by dh, as shown in FIG. 6B. In this case, aperture 20a also moves by dh, and thus the region where aperture 20a is superposed on data mark 29 becomes smaller. It means that T becomes less than 0. Here, controller 31 generates a drive signal corresponding to T, that is, the track control signal, to control probe driver 26, returning aperture 21a to the regular position. With the optical storage of the invention, the movement direction of apertures 20a, 21a and 22a can accord with the direction of track 33 all the time. Thus, the optical storage is able to reproduce the information recorded on recording medium 28 without error. This means that the optical storage can perform tracking servo.

In the optical storage and tracking control method using it according to the present invention, the tracking probes are separately added to the fiber probe, and rays of light incident- from the medium are sensed by the tracking probes, to accord the scanning direction with the track direction by the sensed optical signal. Accordingly, the information recorded on the recording medium can be reproduced without error. Furthermore, the present invention executes the tracking servo so that it can be applied to near field optical scanning microscope and high-density optical storage using near field optical effect.

It will be apparent to those skilled in the art that various modifications and variations can be made in the optical storage using near field optical effect and tracking control method using the same of the present invention without departing from the spirit or scope of the invention. Thus, it is intended that the present invention cover the modifications and variations of this invention provided they come within the scope of the appended claims and their equivalents.

What is claimed is:

1. An optical storage apparatus, comprising:
    a recording medium for storing and reproducing information;
    an optical source for generating rays of light used for storing and reproducing the information;
    a plurality of probing means for reading the information recorded on the recording medium and probing the track direction of the recording medium;
    control means for providing a tracking control signal to driving means using information sensed by the probing means; and
    driving means for driving the plurality of probing means according to the tracking control signal supplied from the control means, to control the tracking direction of the probing means,
    wherein the plurality of probing means includes:
        a first probe for probing the intensity of radiation distributed on the recording medium, to read the information recorded on the recording medium, and
        a plurality of second probes for probing the intensity of radiation distributed on the recording medium used in judging.

2. The optical storage apparatus as claimed in claim 1, wherein one end of each of the first probe and second probes is sharp in a conical shape.

3. The optical storage apparatus as claimed in claim 1, wherein one end of each of the first probe and plurality of second probes has an aperture with a specific diameter.

4. The optical storage apparatus as claimed in claim 1, wherein a metal layer is formed on the surfaces of the first probe and plurality of second probes, the metal layer being for intercepting rays of light.

5. The optical storage apparatus as claimed in claim 1, further comprising a plurality of optical sensing means for sensing the intensity of radiation of rays of light probed by the plurality of second probes, to generate tracking signals corresponding to the sensed intensity of radiation.

6. The optical storage apparatus as claimed in claim 1, wherein the tracking control signal supplied from the control means is generated according to the difference between the tracking signals generated by the plurality of optical sensing means.

7. An optical storage apparatus using near field optical effect, which has a recording medium and optical source, the optical storage comprising:

a first probe for probing the intensity of radiation distributed on the recording medium, to read information recorded on the recording medium;

a plurality of second probes for probing the intensity of radiation distributed on the recording medium, to judge if the track direction of the recording medium accords with the information scanning direction of the first probe;

probe control means for controlling the tracking direction of the first and second probing means according to a tracking control signal;

record information generating means for sensing the intensity of radiation probed by the first probe, to generate a information signal corresponding to information recorded on the recording medium;

optical sensing means for sensing the intensity of radiation probed by the plurality of second probes, to generate tracking signals corresponding to the sensed intensity of radiation; and control means for generating a tracking control signal according to the tracking signals generated by the optical sensing means, and providing it to the probe control means.

8. The optical storage apparatus as claimed in claim 7, wherein the points of the first probing means and plurality of second probing means are arranged in a straight line, having a predetermined interval.

9. The optical storage apparatus as claimed in claim 7, wherein one end of each of the first probing means and plurality of second probing means is sharp in a conical shape.

10. The optical storage apparatus as claimed in claim 7, wherein one end of the first probing means and plurality of second probing means has an aperture with a predetermined diameter.

11. The optical storage apparatus as claimed in claim 7, wherein a metal layer is formed on the surfaces of the first probing means and plurality of second probing means, the metal layer being for intercepting rays of light.

12. The optical storage apparatus as claimed in claim 7, wherein the tracking control signal supplied from the control means is generated according to the difference between the tracking signals generated by the plurality of optical sensing means.

13. A tracking control method in an optical storage apparatus using a near field optical effect, comprising:

probing an intensity of radiation distributed on a recording medium, to judge if a track direction of the recording medium on which information is recorded accords with a scanning direction for the information;

sensing the probed intensity of radiation, to generate tracking signals corresponding thereto;

providing a tracking control signal for according the scanning direction with the track direction depending on the tracking signals;

controlling the scanning direction to accord with the track direction according to the tracking control signal; and reproducing the information recorded on the recording medium when the scanning direction accords with the track direction, wherein the tracking signals correspond to the intensity of radiation distributed on the recording niedium and received by two tracking probes.

14. The method as claimed in claim 13, wherein the tracking control signal is calculated by the difference between the tracking signals.

\* \* \* \* \*